United States Patent [19]
Hahnfeld

[11] Patent Number: 4,690,976
[45] Date of Patent: Sep. 1, 1987

[54] BLENDS OF OLEFINIC AND MONOVINYLIDENE AROMATIC POLYMERS

[75] Inventor: Jerry L. Hahnfeld, Midland, Mich.

[73] Assignee: The Dow Chemical Company, Midland, Mich.

[21] Appl. No.: 820,505

[22] Filed: Jan. 21, 1986

Related U.S. Application Data

[63] Continuation-in-part of Ser. No. 519,438, Aug. 1, 1983, abandoned.

[51] Int. Cl.$^4$ .............. C08L 51/04; C08L 51/06; C08L 23/06; C08L 23/10
[52] U.S. Cl. .......................... 525/70; 525/75; 525/86; 525/931; 525/240
[58] Field of Search ............ 525/70, 75, 931, 290

[56] References Cited

U.S. PATENT DOCUMENTS

| | | | |
|---|---|---|---|
| 3,632,675 | 1/1972 | Foglesong et al. | 525/70 |
| 3,683,050 | 8/1972 | Meredith et al. | 525/75 |
| 3,894,117 | 7/1975 | Agouri et al. | 525/98 |
| 4,020,025 | 4/1977 | Zeitler et al. | 260/25 HB |
| 4,031,166 | 6/1977 | Bronstert et al. | 260/876 B |
| 4,188,432 | 2/1980 | Holden et al. | 260/876 B |
| 4,340,689 | 7/1982 | Joffrion | 525/290 |
| 4,386,187 | 5/1983 | Grancio et al. | 525/96 |
| 4,412,896 | 11/1983 | Lemattre et al. | 525/290 |
| 4,503,187 | 3/1985 | Gunesin et al. | 525/71 |

FOREIGN PATENT DOCUMENTS

| | | |
|---|---|---|
| 0060524 | 11/1982 | European Pat. Off. |
| 0060525 | 11/1982 | European Pat. Off. |
| 2413375 | 10/1975 | Fed. Rep. of Germany |
| 48-43031 | 6/1973 | Japan |
| 49-28637 | 3/1974 | Japan |
| 56-038338 | 4/1981 | Japan |
| 57-135845 | 8/1982 | Japan |
| 1363466 | 12/1971 | United Kingdom |

OTHER PUBLICATIONS

Paul–"Interfacial Agents . . . for Polymer Blends" Polymer Blends, vol. 2, chapter 12 (1978 by Academic Press) pp. 35–41 and 50–53.
Journal of Applied Polymer Sci., vol. 17, pp. 2791–2800 (1973).
Journal of Polym. Sci., Polymer Symposium 62, pp. 309–341 (1978).
Brit. Polym. Journal, vol. 10, pp. 17–22 (1978).
"Multiphase Polymers", S. L. Cooper and G. M. Estes, Eds., Adv. Chem. Ser., 176, pp. 369–379, (1979).
Journal of J. Polym. Sci., Polym. Phys. Ed., vol. 19, p. 1269 (1981).
Polymer Engineering and Science, vol. 21, pp. 839–843 (1981).
Journal of Polymer Sci., Polym. Letters Ed., vol. 19, pp. 79–84 (1981).
Journal of Polymer Sci., Polym. Physics Ed., vol. 20, pp. 2209–2217 (1982).
Paper No. 7086, presented at 1982 AICHE Meeting in Los Angeles, by Kesari and Salovey (1982).
European Polymer Journal, vol. 19, pp. 81–84 (1983).
Chemicalweek—McGraw-Hill 2/17/82, pp. 42–46.
Plastics World—New Materials 12/79, p. 86.
Polymer Engineering & Science, Mid-Jun. 1984, vol. 24, No. 8, "Application of Polymer Blends'"—Robeson—p. 591.

*Primary Examiner*—Carman J. Seccuro
*Attorney, Agent, or Firm*—Jonathan W. Morse

[57] ABSTRACT

A polymer resin comprising a blend of an olefin polymer, such as polyethylene, a monovinylidene aromatic polymer, such as polystyrene, and a grafted, block copolymer compatibilizing agent. The compatibilizing agent comprises an α-olefin copolymer substrate grafted with amounts of monovinylidene aromatic polymer. Preferably, the α-olefin copolymer substrate is a terpolymer of ethylene, propylene and a non-conjugated diolefin. This thermoplastic material has very desirable property combinations, combining the desirable properties from the olefinic and monovinylidene aromatic polymers. The blend can be shaped into final products by thermoforming techniques yet possesses many desirable polyolefin properties such as environmental stress crack resistance.

22 Claims, No Drawings

BLENDS OF OLEFINIC AND MONOVINYLIDENE AROMATIC POLYMERS

CROSS-REFERENCE TO RELATED APPLICATION

This is a continuation in part of application Ser. No. 519,438 filed Aug. 1, 1983, now abandoned.

BACKGOUND OF THE INVENTION

This invention relates to a polymer blend comprising an amount of olefinic polymer such as polyethylene, an amount of a monovinylidene aromatic polymer such as polystrene and, as a compatibilizer, an amount of an α-olefin copolymer rubber which has graft polymerized thereto an amount of monovinylidene aromatic polymer. These polymer blends have very attractive combinations of properties, including thermoformability, moldability, resistance to naturally-occurring organic substances which tend to accelerate the degradation of some thermoplastic resin parts (e.g., fats and greases), ductility, low cost, and other characteristics. Such combinations of properties make these compositions useful for applications such as packaging, disposable containers and the like. The blends have many of the advantages of the constituent olefinic and monovinylidene aromatic polymers and may be shaped into products by many of the known thermoplastic forming techniques, such as thermoforming, injection molding, stamping, forging, solid phase forming, rotary molding or the like.

As is well known, monovinylidene aromatic polymers such as polystyrene and rubber modified polystyrene are very easily thermoformed and exhibit good impact strength and low temperature properties when thermoformed. Thermoforming is a process whereby a resin sheet or preform which is heat-softened to a temperature below the temperature at which the resin is completely molten or plastified, is formed into the desired shape by an applied pressure or vacuum.

Monovinylidene aromatic polymers, however, are known to have poor environmental stress crack resistance (ESCR). Environmental stress cracking occurs when molded resin parts are subjected to conditions where the part is both placed under stress and exposed to a fat- or grease-containing substance. These conditions occur commonly where materials such as grease- or fat-containing foods are packaged in a molded container. The presence of the grease or fat in the food in combination with the stress placed on the container, associated with filling, sealing and handling, cause such containers to become weakened and easily damaged.

Olefin polymers, on the other hand, such as polyethylene, polypropylene, and the like have relatively good resistance to the action of fats and greases and, therefore, are very desirable for the manufacture of containers for foods and similar materials. When it comes to manufacturing or forming techniques, however, olefin polymers are much less versatile than monovinylidene aromatic polymers. As is known, olefin polymers, due to their relatively sharp melting point, are very difficult to thermoform.

The advantages and drawbacks of the two types of polymers are well known in the art and various attempts have been made to achieve blends of the two types of polymers having desirable combinations of properties. The blending of monovinylidene aromatic and olefinic polymer resins to achieve desirable property combinations is complicated, however, by the incompatibility of the two resins. Attempts to solve the incompatibility problem have focused on the use of specified amounts of the two resins and also on the use of a so-called compatibilizing agent. For examples, of earlier attempts to blend olefin polymer and monovinlidene aromatic polymer resins, see U.S. Pat. Nos. 4,386,187 and 4,386,188 to Grancio et al., the teachings of which are incorporated herein by reference, where a major amount of a crystalline olefin polymer is blended with a minor amount of an amorphous polymer and a block copolymer compatiblizer such as a styrene-butadiene-styrene block compolymer. See also European Patent Applications Nos. 60524 and 60525, both filed Mar. 11, 1982, where styrene-butadiene block copolymers are used to compatibilize blends of an olefin polymer and a high impact polystyrene. In Japanese Patent Announcement Kokai No. 49-28637/1974, olefin and styrene-type resins are blended together with styrene-butadience block copolymers. Japanese Patent Announcement Kokai No. 48-43031/1973 also teaches blends of a polyolefin, an aromatic vinyl polymer and a polymer selected from the group consisting of styrene-butadiene block copolymers, ethylene-vinyl acetate copolymers, ethylene-acrylic acid ester copolymers and ethylene-methacrylic acid ester copolymers. In European Patent Application No. 60525 and U.S. Pat. No. 4,188,432, a hydrogenated styrene-butadiene-styrene block copolymer (i.e., styrene-ethylene-butylene-styrene type polymer) is blended in with styrenic and olefinic polymers. Hydrogenated styrene-butadiene diblock copolymers (i.e., styrene-ethylene butylene type polymers) are also blended with amounts of olefinic and styrenic polymers. See, for example, British Pat. No. 1,363,466; U.S. Pat. No. 4,020,025; Japanese Pat. No. 81-38,338; German Pat. No. 241,375.

In general, however, these approaches to olefin/monovinylidene aromatic polymer blends provide insufficient property combinations and have other undesirable limitations, such as the amounts of the monovinylidene aromatic and olefinic polymers which can be blended and the type of compatibilizing agent that is used.

SUMMARY OF THE INVENTION

According to the present invention, there is provided a polymer blend composition comprising:

(a) at least about 20 weight percent olefin polymer, said weight percent being based on the weight of components (a), (b) and (c);

(b) at least about 5 weight percent monovinylidene aromatic polymer based on the weight of components (a), (b) and (c); and (c) a compatibilizing amount of a monovinylidene aromatic polymer-grafted α-olefin copolymer.

One advantage unique to the present invention is its application to a wide range of polyolefins having diverse physical properties. For example, in the present invention, it is not necessary to attempt to match the specific viscosity of the polyolefin to that of the monovinylidene aromatic polymer to obtain the desired morphology and physical properties.

DETAILED DESCRIPTION OF THE INVENTION

Olefin polymers suitable for use as Component (a) in the blends according to the present invention are well known in the art. These olefin polymers include, for example, polymers of ethylene, propylene and butene including copolymers of two or more of these monomers and copolymers of one or more of these monomers with one or more additional copolymerizable monomers polymerized therewith. Such additional copolymerizable monomers include, for example, olefin monomers having from 5 to 25 carbon atoms and ethylenically unsaturated carboxylic acids (both mono- and difunctional) as well as derivatives of these acids, such as esters and anhydrides. The preferred olefin polymers comprise at least 50 percent by weight ethylene, propylene and/or butene polymerized therein, more preferably at least 75 percent by weight. Exemplary monomers which can be polymerized therewith include octene, arylic acid, methacrylic acid, vinyl acetate and maleic anhydride. Especially preferred olefin polymers are low density polyethylene; high density polyethylene; polypropylene; and linear low density polyethylene (a copolymer of ethylene and up to about 20 weight percent of one or more additional α-olefins having from 3 to 25 carbon atoms). Suitable methods for the preparation of all of these types of polymers are well known in the art.

As is well known, high density polyethylene (HDPE) is generally produced by a low pressure, coordination catalyst polymerization process and consists mainly of long linear polyethylene chains. The density of this type of polymer is usually at least about 0.94 grams per cubic centimeter as determined by ASTM Test Method D 1505, with a melt index in the range of from about 0.01 to about 35 grams per 10 minutes. These and other olefin polymer melt indexes referred to herein can generally be determined by ASTM Test Method D 1238.

Low density polyethylene (LDPE) is generally produced by a high pressure polymerization process using a free radical initiator, the molecules being mainly highly branched chains. LDPE usually has a density of less than about 0.94 grams per cubic centimeter (ASTM D 792) and a melt index of from about 0.01 to about 25 grams per 10 minutes. Linear low density polyethylene (LLDPE) is typically a copolymer of ethylene and up to about 20 weight percent of at least one additional α-olefin monomer having from 3 to 25 carbon atoms per molecule. LLDPE is generally prepared by a low pressure polymerization process using a coordination catalyst and is structurally an intermediate between the long linear chains of HDPE and the highly branched chains of LDPE. The density of LLDPE generally ranges from about 0.91 grams per cubic centimeter to about 0.94 grams per cubic centimeter (ASTM D 792), with melt indexes in the range of from about 0.01 to about 15 grams per 10 minutes. It should also be noted that blends of the above three types and other types of olefin polymer resins can suitably be employed as the olefin polymer in the present invention.

The blends according to the present invention contain at least about 20 percent by weight olefin polymer. Preferably the blends according to the present invention contain from about 20 to about 90 weight percent olefin polymer, more preferably the blends contain from about 40 to about 75 weight percent olefin polymer and most preferably from about 55 to about 75 weight percent. These weight percentages of olefin polymer are based on the total weight of the olefin polymer, monovinylidene aromatic polymer and compatibilizer components.

The monovinylidene aromatic polymers suitably employed in the present invention generally comprise, polymerized therein, at least about 50 percent by weight and preferably at least 90 percent by weight of one or more monovinylidene aromatic monomers. Suitable monovinylidene aromatic monomers are represented by the following formula:

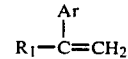

wherein $R_1$ is selected from the group of radicals consisting of hydrogen and alkyl radicals containing three carbons or less, and Ar is selected from the group of radicals consisting of phenyl, halophenyl, alkylphenyl, and alkylhalophenyl. Exemplary monovinylidene aromatic monomers include para-vinyl toluene and α-methylstyrene. Styrene is a particularly desirable monovinylidene aromatic monomer for the monovinylidene aromatic polymers used in the practice of the present invention. In addition to the monovinylidene aromatic monomer, there may also be polymerized therewith in the monovinylidene aromatic polymer minor amounts of other copolymerizable monomers. The various monomers compolymerizable with monovinylidene aromatic monomers are well known and include, for example, ethylenically-unsaturated nitrile monomers such as acrylonitrile; and ethylenically-unsaturated mono- and difunctional carboxylic acids and derivatives thereof such as esters and, in the case of difunctional acids, anhydrides. In some cases it is also desirable to copolymerize a cross-linking monomer such as divinyl benzene into the monovinylidene aromatic polymer.

It has been found that the blends according to the present invention desirably comprise at least about 5 percent by weight monovinylidene aromatic polymer. Preferably, the blends according to the present invention comprise from about 5 to about 75 percent by weight monovinylidene aromatic polymer, more preferably from about 10 to about 50 percent by weight monovinylidene aromatic polymer, and most preferably from about 15 to about 35 percent.

The key to preparing desirable blends according to the present invention is the incorporation in the blends of the specific compatibilizer. The compatibilizer employed in the practice of the present invention is a monovinylidene aromatic polymer-grafted α-olefin copolymer. The substrate or base of the graft copolymer compatibilizer is a polymer of an α-olefin monomer having from 2 to 4 carbon atoms and at least one additional different polymerizable olefin monomer (which can be mono- or di-olefin) having from 3 to 16 carbon atoms. For example, the compatibilizer base can be a copolymer of ethylene and one additional α-olefin monomer having from 3 to 15 carbon atoms, preferably from 3 to 5 carbon atoms, for example, propylene. These copolymers are often generically referred to as EP rubbers of EP polymers. These substrate polymers are different from and nonmiscible with the olefin polymers of component (a). As used herein the term nonmiscible means not thermodynamically miscible.

In another embodiment of the present invention, the base for the graft copolymer compatibilizer is a terpolymer of ethylene, one or more mono-alpha-olefins having from 3 to 16 carbon atoms (e.g., propylene), and a non-conjugate diene monomer (e.g., 5-ethylidene-2-norbornene) Other exemplary non-conjugated dienes include 1,4-hexadiene and dicyclopentadiene. These terpolymeric substrates are often generically referred to as EPDM rubbers of EPDM polymers.

The substrate α-olefin copolymers generally comprise polymerized therein from about 20 to about 80 weight percent based on substrate weight of the $C_2$–$C_4$ α-olefin and from about 20 to about 80 weight percent of a different $C_3$–$C_{16}$ alpha-olefin. In the case of the preferred terpolymeric substrates such as EPDM polymers, from about 1 to about 15 weight percent of the third monomer is polymerized therein. Preferably, the substrate for the graft copolymer compatibilizer is an EPDM rubber comprising from about 25 to about 75 weight percent ethylene; from about 20 to about 65 weight percent higher alpha-olefin having from 3 to 16 carbon atoms; and from about 1 to about 10 weight percent nonconjugated diene polymerized therein, these weight percents being based on the total weight of the EPDM rubber.

The graft or superstrate portion of the graft copolymer compatibilizer is also monovinylidene aromatic polymer as is generally defined above. The grafted monovinylidene aromatic polymer can be grafted onto the substrate by any of the grafting techniques generally known in the art. The preformed α-olefin copolymer can be contacted with the graftable monovinylidene aromatic monomer or monomers (and optional monomer(s) copolymerizable therewith) in a polymerization system of the well-known mass, mass-solution, suspension, mass-suspension types or the like. In general, the grafting reaction can be free radical (thermally, chemically or radiation initiated), anionic or Friedel-Crafts.

When grafting an EPDM rubber substrate or other substrate having residual unsaturation, it has been found very advantageous to initially hydroperoxidize, utilizing singlet oxygen at least a portion of the double bonds present in the residually unsaturated α-olefin copolymer substrate by the combination in solution of: the substrate containing some unsaturation, a sensitizing compound such as methylene blue and oxygen, then exposing this mixture to the light from a high pressure sodium vapor lamp. The α-olefin copolymer hydroperoxide formed in this manner can then be conveniently grafted at these hydroperoxide sites by a peroxy-compound-initiated grafting reaction. Other techniques for grafting monovinylidene aromatic polymer onto α-olefin copolymer substrates are taught in U.S. Pat. Nos. 3,489,822; 3,489,821; 3,642,950; 3,819,765; 3,538,190; 3,538,191; 3,538,192; 3,657,395; 3,671,608; 3,683,050; 3,876,727; and 4,340,669; the teachings of which patents are hereby incorporated herein by reference.

In order to achieve sufficient compatibilization of the monovinylidene aromatic and olefin polymer resins, there needs to be grafting of a sufficient amount of monovinylidene aromatic graft polymer onto the olefin copolymer substrate. The molecular weight of the grafted monovinylidene aromatic polymer also needs to be sufficient that molecular entanglements occur with the ungrafted monovinylidene aromatic polymer (e.g., about 20,000 for polystyrene). Preferably, the molecular weight of the grafted monovinylidene aromatic polymer is about the same as the molecular weight of that which is not grafted. In a preferred method for the practice of the present invention both the ungrafted and grafted monovinylidene aromatic polymer are prepared at the same time and hence have very similar or identical molecular weights and compositions.

The actual degree of grafting of monovinylidene aromatic polymer onto the rubber substrate can vary according to the amount of compatibilizer which is going to be used. If the graft copolymer compatibilizer is highly grafted with monovinylidene aromatic polymer, then less can be used to compatibilize the monovinylidene aromatic and olefin polymer resins. Conversely, however, if the graft copolymer compatibilizing agent is lightly grafted with the monovinylidene aromatic polymer, then more of such compatibilizing agent needs to be included. It has generally been found that to get sufficient compatibilization, the degree of grafting in terms of the ratio of the weight of the grafted polymer to the weight of the substrate may vary from about 0.1 to about 2. Preferably, the degree of grafting is from about 0.7 to about 2. Within these ranges of grafting degrees, it has been found that from about 1 to about 20 percent by weight of the graft copolymer compatibilizer is desirable in the monovinylidene aromatic/olefin polymer blends according to the present invention, which weight percent is based on the total weight of the monovinylidene aromatic polymer, olefin polymer and compatibilizer component. Preferably, from about 2 to about 15 percent by weight of the compatibilizer is used and most preferably from about 4 to about 15 percent by weight. In general, however, the physical properties of the blends improve with the higher graft copolymer concentrations.

Within the scope of the present invention, various other types of ingredients can be included in these blends compositions. Such other ingredients include fillers, pigments, flame retarding agents, and the like. There can also be included in the blends according to the present invention amounts of additional polymers which are compatible with the present blends. For example, amounts of elastomeric materials can be used to further improve the impact resistance of the blends. Such elastomeric materials include conjugated diene rubbers, such as polybutadiene and butadiene copolymers, and also additional amounts of EP or EPDM rubbers which are not grafted with monovinylidene aromatic polymer. In addition, blowing agents can be incorporated into the blends to produce foam structures. The above ingredients can be introduced in any of the components of the blend composition, can be introduced during the blending of the monovinylidene aromatic polymer, olefin polymer and compatibilizer components, or can be introduced into the resultant blend in a separate operation.

The three components of the present invention, the olefinic polymer, the monovinylidene aromatic polymer, and the compatibilizer, can be separately prepared and then combined to produce the blends. It has been found very desirable and convenient to prepare the monovinylidene aromatic polymer at the same time the superstrate monovinylidene aromatic polymer is being grafted onto the α-olefin copolymer substrate to form the graft copolymer compatibilizer, then mix this compatibilizer/monovinylidene aromatic polymer combination with the olefin polymer component.

Mixing techniques and devices suitable for the requisite melt blending of the ingredients of the present blends are well known in the art. The components are melt blended via suitable means, including extruders which are equipped with mixing sections, a Banbury mixer, twin-roll mills, or injection molding.

EXAMPLES

In the following examples, blends according to the present invention are prepared containing an olefinic polymer, a monovinylidene aromatic polymer and a grafted EPDM compatibilizer. These examples will illustrate the benefits achieved according to the practice of the present invention. Several different olefinic polymers and several different EPDM rubbers are illustrated.

Although the bulk of the monovinylidene aromatic polymer can be prepared separately from the graft portion of the compatibilizer component, the following examples will illustrate one aspect of the present invention where the graft portion of the compatibilizer component and at least a substantial portion of the monovinylidene aromatic polymer component are produced in the same polymerization system. The product of this process, containing ungrafted monovinylidene aromatic polymer, monovinylidene aromatic polymer grafted to EPDM rubber substrate, and a small amount of ungrafted EPDM rubber, is then blended with amounts of the olefinic polymer, and in some cases, additional monovinylidene aromatic polymer, to produce the blends according to the present invention.

The notched Izod impact resistance (Izod) values for the resin compositions identified below are determined according to American Society for Testing and Materials (ASTM) Test Method D-256 at 23° C. and are given in foot pounds per inch of notch (ft lbs/in). The tensile strengths at yield and rupture (Ty and Tr, respectively), tensile modulus and percent elongation (%E) are determined according to ASTM D-638 at a specimen stretching rate of 0.2 inches per minute. The tensile modulus, Ty and Tr, values are given in pounds per square inch (psi).

In another test used to evaluate the resin compositions, E(ult), the energy required to break a molded sample 100 mils thick is determined by a Rheometrics high-rate impact tester. The sample is broken using an impact speed of 8,000 inches per minute at a temperature of 23° C. and the energy required to break the sample is given in units of inch-pounds (in.lbs.). The test apparatus is manufactured by Rheometrics Inc., Union, N.J.

PREPARATION OF COMPATIBILIZER AND MONOVINYLIDENE AROMATIC POLYMER COMPONENTS

A feed solution is prepared containing 66 weight percent (wt %) styrene, 25 weight percent Isopar ® C, 8 weight percent EPDM rubber, 1 weight percent of a 0.1 percent solution of methylene blue dye in methanol, and 500 parts per million (ppm) 1,1-bistertiarybutyl-peroxycyclohexane initiator. Isopar ® C, commercially available from the Exxon Oil Company is a solvent containing about 85 percent isooctane the balance being various paraffinic hydrocarbons. The EPDM rubber is EPsyn ® 5508 which is manufactured by the Copolymer Rubber and Chemical Corporation. This rubber is a terpolymer of ethylene, propylene and 5-ethylidene-2-norbornene having a Raw Mooney Viscosity (ML 1+4 at 125° C.) of 55 and a specific gravity of 0.86 grams per cubic centimeter (g/cc).

These ingredients are combined and mixed to form a generally homogeneous feed solution. Air is bubbled into the feed mixture by means of a sparge. The feed solution is then exposed to visible light having a wavelength of about 400 to 700 nanometers by being fed through a clear heavy wall, Pyrex ® glass tube having a $\frac{3}{8}$ inch heavy wall outer diameter while a high pressure, 100 watt sodium vapor lamp is shining onto the tube from a distance of about $3\frac{1}{2}$ inches. This feed solution, at rooom temperature and nearly atmospheric pressure, is continuously pumped through the tubes with the median length of exposure to the light being about 20 seconds. In this step a hydroperoxide group is attached to EPDM rubber molecules, the product being referred to as an EPDM hydroperoxide. Testing the EDPM hydroperoxide indicates a hydroperoxide group concentration [—OOH] of 17.4 micromoles of hydroperoxide groups per gram of EPDM rubber (17.4 $\mu$M/g).

The hydroperoxide concentration is determined for this and other examples by reacting the hydroperoxide with triphenyl phosphine. An amount of triphenyl phosphine is dissolved with a known amount of the rubber hydroperoxide and reacts with the hydroperoxide groups to form triphenyl phosphine oxide. The amount of triphenyl phosphine oxide produced is determined by gas chromatography. In this manner, the amount of hydroperoxide per gram EPDM rubber is determined.

The solution of EPDM hydroperoxide in the polymerization feed solution is then supplied to a polymerization reactor system for the polymerization of the styrene to form both the graft portion of the compatibilizer component and the monovinylidene aromatic polymer component. The initiator is already present in the stream and assists in this polymerization. The reactor system is maintained to produce ungrafted polystyrene having a number average molecular weight (Mn) of about 90,000 and a weight average molecular weight (Mw) of about 210,000. It is determined that about 73 percent by weight of the EPDM rubber is grafted with polystyrene and that the G/R, the weight of the grafted polystyrene divided by the total weight of EPDM rubber in the resultant product is about 0.95. The total weight of the EPDM rubber includes both grafted (73 percent) and ungrafted (27 percent) EPDM rubber.

The level of graft formation may be determined by first removing any materials other than polystyrene (both grafted to the EPDM and free) and EPDM rubber (both grafted with polystyrene and ungrafted) by dissolving and reprecipitating the polymers. To do this, a 0.5 g sample of the graft polymerization product (i.e., grafted and ungrafted EPDM in polystyrene) is dissolved in 5 ml of toluene. To this solution is added 3 ml of acetone. The polymers are precipitated by slowly adding 10 ml of 2-propanol. The mixture is centrifuged and the clear solvent is decanted from the precipitate and discarded.

Next, the free polystyrene is separated from the rubber and graft copolymer by selective precipitation. The precipitate from above is dissolved in 5 ml of toluene. With agitation, 7 ml of a methyl ethyl ketone/acetone solution (1:1 volume ratio) is slowly added, resulting in a very fine dispersion. Approximately 15 ml of a methanol/methyl ethyl ketone/acetone solution (1:2:2 volume ratio) is slowly added with agitation until coagulation of a white precipitate begins. The mixture is centrifuged and the clear supernatant liquid decanted from the precipitate. The supernatant liquid contains the free polystyrene which can be characterized by gel permeation chromatography. The precipitate contains the free EPDM rubber as well as the EPDM-polystyrene graft copolymer. The graft to rubber ratio (G/R) of this sample can be determined by infrared spectroscopy. The percentage of the rubber which is grafted with polystyrene is then calculated via a statistical method using the graft to rubber ratio, molecular weight of the EPDM rubber and molecular weight of the polystyrene, assuming the free polystyrene and grafted polystyrene have the same molecular weight. This statistical method is further described by L. H. Tung and R. M. Wiley in the Journal of Polymer Science, Polymer Physics Edition, Volume. 11, page 1413, 1973; which article is hereby incorporated by reference thereto.

The relevant data concerning this product (compatibilizer/polystyrene combination A) and four similar compatibilizer/polystyrene combinations B, C, D and E is summarized below in Table I.

The composition of the EPDM rubber is given in weight percentages of constituents based on total weight EPDM rubber.

TABLE I

| | Compatiblizer/Polystyrene Combinations | | | | |
|---|---|---|---|---|---|
| | A | B | C | O D | E |
| EPDM Rubber | EPsyn 5508 | EPsyn 5508 | EPsyn 5508 | Expt'l[1] | EPsyn 5508 |
| Wt % Ethylene | 69 | 69 | 69 | 47 | 69 |
| Wt % Propylene | 27 | 27 | 27 | 49 | 27 |
| Wt % 5-Ethylidene-2-norbornene [-OOH] ($\mu$M/g) | 4 17.4 | 4 14.9 | 4 12.3 | 4 8 | 4 16.8 |
| G/R | 0.95 | 1.45 | 1.24 | 0.80 | 0.84 |
| Wt % Rubber Grafted Polystyrene | 73 | 89 | * | * | * |
| Mn | 89,600 | 65,700 | 100,000 | 86,600 | 96,100 |
| Mw | 208,000 | 147,000 | 224,000 | 194,000 | 209,000 |
| Wt % EPDM Rubber in the Combination | 14.9 | 14.7 | 13.5 | 15.4 | 16.7 |

* Not measured
[1]An experimental EPDM rubber having the indicated composition.

PREPARTION OF OLEFIN POLYMER/MONOVINYLIENE AROMATIC POLYMER BLENDS

In the following examples the below-indicated olefin polymers are blended with amounts of the above-described compatibilizer/polystyrene combinations A through D. The olefin polymer and compatibilizer/polystyrene combinations are melt blended together on a two-roll mill mixer having front and back roll temperatures of 185° C. and 150° C., respectively. The properties of these blends are tested and are shown below in Tables II and III.

Table II below illustrates that various types of olefin polymers can be used, including low density polyethylene (LDPE), high density polyethylene (HDPE), linear low density polyethylene (LLDPE) and polypropylene (PP). The olefin polymer resins used in the following examples have the following properties:

| | Density (g/cc) | Melt Index[3] (g/10 min) |
|---|---|---|
| HDPE 12065[4] | 0.965[1] | 0.9 |
| HDPE 69065[4] | 0.965[1] | 0.60 |
| HDPE 25057[4] | 0.955[1] | 0.25 |
| HDPE 05054P[4] | 0.954[1] | 5.0 |
| LLDPE 2045[4] | 0.920[2] | 1.0 |
| LDPE 682[4] | 0.922[2] | 0.7 |
| PP 5052[5] | 0.90[2] | 1.2 |

[1]Density in grams per cubic centimeter (g/cc) as measured by ASTM D 1505.
[2]Density in grams per cubic centimeter (g/cc) as measured by ASTM D 792.
[3]Melt index in grams per 10 minutes as measured by ASTM D 1238; Condition E being used for LDPE, HDPE and LLDPE, Condition L being used for polypropylene.
[4]Manufactured by The Dow Chemical Company, Midland, Michigan.
[5]Manufactured by Exxon Chemical Company, Houston, Texas.

TABLE II

Example Compositions with Various Olefin Polymers

| | Example No. | | | | | | |
|---|---|---|---|---|---|---|---|
| | 1 | 2 | 3 | 4 | 5 | 6 | 7 |
| Olefin Polymer Type | HDPE 12065 | HDPE 69065 | HDPE 25057 | HDPE 05054P | LLDPE 2045 | LDPE 682 | PP 5052 |
| Wt % | 64% | 64% | 64% | 64% | 64% | 64% | 64% |
| Compatibilizer/Polystyrene Combination | | | | | | | |
| Component | A | A | A | A | A | A | C |
| Wt % | 36% | 36% | 36% | 36% | 36% | 36% | 36% |
| Properties | | | | | | | |
| Izod (ft. lbs./in.) | 4.9[1] | 6.5[1] | 9.1[1] | 1.8 | 13.1 (NB)[2] | 11.2 (NB)[2] | 0.7 |
| Ty (psi) | 3204 | 3344 | 3305 | 3200 | 1494 | 1559 | 3466 |
| Ten. Modulus ($\times 10^5$ psi) | 2.21 | 2.29 | 1.95 | 2.40 | 0.6 | 0.64 | 2.4 |
| E (ult) (in. lbs.) | 96 | * | 93 | * | 156 | 103 | 3 |

* Not measured
[1]Hinged break
[2]No break. The samples deflected rather than broke.

Tables III through VI below illustrate the effect of varying the amounts of the olefin polymer and monovinylidene aromatic polymer components, while keeping the amount of compatibilizer constant. Table III shows that desirable property combinations can be achieved in the claimed ranges with the olefin polymer being low density polyethylene (LDPE). The polyethylene used therein is Dow Low Density Polyethylene Resin 682, commercially available from The Dow Chemical Company. The compositions illustrated in Tables IV and V, containing 5.4 and 3.3 weight percent EPDM, respectively, show that blends containing HDPE as the olefin polymer have good property combinations at varying HDPE levels and at two different compatibilizer levels as well. Table VI shows that blends containing varying amounts of LLDPE as the olefin polymer have good property combinations also.

TABLE III

Example Compositions With Varying Amounts of LDPE

| Example No. | 6 | 8 | 9 | 10 |
|---|---|---|---|---|
| Wt. % LDPE 682 | 64% | 50% | 35% | 20% |
| Compatibilizer/ Polystyrene Combination (Wt. %) | 36% A | 36% A | 36% A | 36% A |
| Added Polystyrene | None | 14% | 29% | 44% |

TABLE III-continued

Example Compositions With Varying Amounts of LDPE

| Example No. | 6 | 8 | 9 | 10 |
|---|---|---|---|---|
| (Wt. %) Properties | | | | |
| Izod (ft. lbs./in.) | 11.2 (NB)[2] | 7.6 (NB)[2] | 2.9 | 0.8 |
| Ty (psi) | 1559 | 2007 | 3116 | 5049 |
| Tr (psi) | 2038 | 2438 | 3102 | 5049 |
| % E | >50% | 27.4% | 4.8% | 2.2% |
| Tensile Modulus ($\times 10^5$ psi) | 0.6 | 1.2 | 1.9 | 2.8 |
| E(ult) (in. lbs.) | 103 | 29 | 13 | * |

* Not measured.
[2] No break. The samples deflected rather than broke.

TABLE IV

Example Compositions Containing 5.4% EPDM and Varying Amounts of HDPE

| Example No. | 1 | 11 | 12 | 13 | 14 |
|---|---|---|---|---|---|
| Wt. % HDPE 12065 | 64% | 50% | 35% | 20% | 64% |
| Compatibilizer/Polystyrene Combination (Wt. %) | 36% A | 36% A | 36% A | 36% A | 36% B |
| Added Polystyrene (Wt. %) | None | 14% | 29% | 44% | None |
| Properties | | | | | |
| Izod (ft. lbs./in.) | 4.9[1] | 2.3[1] | 1.7 | 0.6 | 6.9[1] |
| Ty (psi) | 3204 | 3687 | 4461 | * | 3531 |
| Tr (psi) | 2602 | 3622 | 4023 | 5132 | 3160 |
| % E | >50% | 25% | 3% | 1.5% | >50% |
| Tensile Modulus ($\times 10^5$ psi) | 2.2 | 2.6 | 3.1 | 3.5 | 2.5 |
| E(ult) (in. lbs.) | 96 | 16 | * | * | 129 |

* Not measured.
[1] Hinged break.

TABLE V

Example Compositions Containing 3.3% EPDM and Varying Amounts of HDPE

| Example No. | 15 | 16 | 17 | 18 |
|---|---|---|---|---|
| Wt. % HDPE 12065 | 80% | 72% | 64% | 50% |
| Compatibilizer/Polystyrene Combination (Wt. %) | 20% E | 20% E | 20% E | 20% E |
| Added Polystyrene (Wt. %) | None | 8% | 16% | 30% |
| Properties | | | | |
| Izod (ft. lbs./in.) | 6.5[1] | 1.7 | 1.0 | 0.74 |
| Ty (psi) | 3420 | 3379 | 3469 | 3801 |
| % E | >50% | >50% | >50% | 8.2% |
| Tensile Modulus ($\times 10^5$ psi) | 2.8 | 2.8 | 2.8 | 3.1 |

[1] Hinged break.

TABLE VI

Example Compositions with Varying Amounts of LLDPE

| Example No. | 5 | 19 | 20 | 21 |
|---|---|---|---|---|
| Wt. % LLDPE 2045 | 64% | 50% | 35% | 20% |
| Compatibilizer/Polystyrene Combination | 36% A | 36% A | 36% A | 36% A |

TABLE VI-continued

Example Compositions with Varying Amounts of LLDPE

| Example No. | 5 | 19 | 20 | 21 |
|---|---|---|---|---|
| (Wt. %) | | | | |
| Added Polystyrene (Wt. %) | None | 14% | 29% | 44% |
| Properties | | | | |
| Izod (ft. lbs./in.) | 13.1 (NB)[2] | 13.0 (NB)[2] | 5.3[1] | 1.0 |
| Ty (psi) | 1494 | 1906 | 2812 | 4806 |
| Tr (psi) | 1746 | 2268 | 2877 | 4694 |
| % E | >50% | 50% | 11.5% | 2.2% |
| Tensile Modulus ($\times 10^5$ psi) | 0.6 | 1.1 | 1.9 | 2.85 |
| E(ult) (in. lbs.) | 156 | 108 | 19 | — |

[1] Hinged break.
[2] No break, the samples deflected rather than broke.

Table VII below illustrates the use of compatibilizer components containing two different EPDM rubber compositions. As shown, for compatibilizing polypropylene/polystyrene blends, EPDM rubbers containing lower ethylene/propylene ratios provide better property combinations.

TABLE VII

Example Compositions with Different EPDM Rubbers in Compatibilizer Component

| Example No. | 7 | 15 |
|---|---|---|
| Wt. % Compatibilizer/Polystyrene component | 36% C | 36% D |
| EPDM Rubber | | |
| Weight % Ethylene | 68.8 | 47 |
| Weight % Propylene | 27.4 | 49 |
| Weight % 5-Ethylidene-2-Norbornene | 3.8 | 4 |
| Olefin Polymer | | |
| Type | PP 5052 | PP 5052 |
| Wt. % | 64 | 64 |
| Properties | | |
| Izod (ft. lbs./in.) | 0.7 | 1.2 |
| Ty (psi) | 3466 | 3119 |
| Tr (psi) | 3756 | 2463 |
| % E | 12.7% | 16% |
| Tensile Modulus ($\times 10^5$ psi) | 2.4 | 2.6 |
| E(ult) (in. lbs.) | 3 | 40 |

As is apparent from the foregoing specification, the present invention is susceptible of being embodied with various changes and modifications to achieve various desired characteristics in the final compositions. For this reason it is to be understood that all of the foregoing is intended to be merely illustrative and not restricting or otherwise limiting the scope of the present invention except as it is set forth and defined in the following claims.

What is claimed is:

1. A polymer blend composition comprising:
   (a) at least about 20 weight percent olefin polymer, said weight percent being based on the weight of components (a), (b) and (c);
   (b) at least about 5 weight percent monovinylidene aromatic polymer based on the weight of components (a), (b) and (c); and
   (c) a compatibilizing amount of a monovinylidene aromatic polymer-grafted α-olefin copolymer provided that the α-olefin copolymer of component (c) is different from and nonmiscible with the olefin polymer of component (a) and comprises a polymer of an α-olefin monomer having from 2 to 4 carbon atoms and at least one additional different polymerizable alpha-olefin monomer having from 3 to 16 carbon atoms.

2. A composition according to claim 1 comprising from about 20 to about 90 weight percent (a).

3. A composition according to claim 1 comprising from about 5 to about 75 weight percent (b).

4. A composition according to claim 1 comprising from about 1 to about 20 weight percent (c) based on the weight of components (a), (b) and (c).

5. A composition according to claim 1 comprising from about 2 to about 15 weight percent (c).

6. A composition according to claim 1 consisting essentially of (a), (b) and (c).

7. A composition according to claim 1 wherein (a) is polyethylene.

8. A composition according to claim 1 wherein (a) is high density polyethylene.

9. A composition according to claim 1 wherein (a) is linear low density polyethylene.

10. A composition according to claim 1 wherein (a) is low density polyethylene.

11. A composition according to claim 1 wherein (a) is polypropylene.

12. A composition according to claim 1 wherein the monovinylidene aromatic polymer of (b) and (c) is polystyrene.

13. A composition according to claim 1 wherein the monovinylidene aromatic polymer of (b) and (c) is poly-para-vinyltoluene.

14. A composition according to claim 1 wherein the α-olefin copolymer comprises from about 80 to about 20 weight percent of an α-olefin monomer having from 2 to 4 carbon atoms and from about 20 to about 80 weight percent of at least one different polymerizable olefin monomer having from 3 to 16 carbon atoms.

15. A composition according to claim 1 wherein the α-olefin copolymer comprises from about 80 to about 20 weight percent of ethylene and from about 20 to about 80 weight percent propylene.

16. A composition according to claim 15 wherein the α-olefin copolymer comprises from about 80 to about 20 weight percent ethylene, from about 20 to about 80 weight percent propylene and from about 1 to about 15 weight percent of a non-conjugated diolefin.

17. A composition according to claim 16 wherein the non-conjugated diolefin is 5-ethylidene-2-norbornene.

18. An article prepared from a composition according to claim 1.

19. A method for preparing the blend composition of claim 1 comprising combining about 20 percent by weight olefin polymer, at least about 5 percent by weight monovinylidene aromatic polymer and a compatibilizing amount of a monovinylidene aromatic polymer-grafted α-olefin copolymer.

20. A composition according to claim 1 comprising at least about 35 weight percent (a).

21. A composition according to claim 1 comprising at least about 40 weight percent (a).

22. A composition according to claim 1 comprising from about 40 to about 75 weight percent (a).

* * * * *